US009057944B2

(12) United States Patent
Sugiyama

(10) Patent No.: US 9,057,944 B2
(45) Date of Patent: Jun. 16, 2015

(54) SHUTTER GLASSES AND IMAGE DISPLAY SYSTEM COMPRISING AT LEAST ONE OF A DRIVE CIRCUIT OR A DRIVE POWER SUPPLY ACCOMMODATED ON A TEMPLE PORTION OF A FRAME MEMBER

(75) Inventor: Nobuo Sugiyama, Suwa (JP)

(73) Assignee: SEIKO EPSON CORPORATION, Tokyo (JP)

(*) Notice: Subject to any disclaimer, the term of this patent is extended or adjusted under 35 U.S.C. 154(b) by 876 days.

(21) Appl. No.: 13/223,715

(22) Filed: Sep. 1, 2011

(65) Prior Publication Data

US 2012/0062806 A1 Mar. 15, 2012

(30) Foreign Application Priority Data

Sep. 9, 2010 (JP) ................................. 2010-202268

(51) Int. Cl.
*G02F 1/1335* (2006.01)
*G03B 35/16* (2006.01)
*G02B 27/22* (2006.01)

(52) U.S. Cl.
CPC ............ *G03B 35/16* (2013.01); *G02B 27/2264* (2013.01)

(58) Field of Classification Search
CPC ........................... H04N 13/0434; G02B 27/26
USPC .......................................................... 349/13
See application file for complete search history.

(56) References Cited

U.S. PATENT DOCUMENTS

D596,659 S  *  7/2009  Kucera et al. ................ D16/326
2002/0105483 A1 *  8/2002  Yamazaki et al. ................ 345/7
2005/0275714 A1 * 12/2005  Ishikawa et al. ........... 348/14.02
2008/0238815 A1   10/2008  Ishino et al.
2009/0066863 A1 *  3/2009  Chen ............................... 349/13
2010/0177254 A1 *  7/2010  MacNaughton et al. ....... 349/15
2011/0071416 A1    3/2011  Terada et al.
2011/0310318 A1   12/2011  Kawagoe
2012/0268352 A1   10/2012  Ishino et al.
2013/0076998 A1    3/2013  Kakinuma et al.
2013/0100363 A1    4/2013  Kakinuma et al.
2013/0107362 A1    5/2013  Yoneda et al.
2013/0120706 A1    5/2013  Kakinuma et al.

FOREIGN PATENT DOCUMENTS

| JP | A-09-005666 | 1/1997 |
| JP | A-9-5904 | 1/1997 |
| JP | A-10-253918 | 9/1998 |
| JP | A-2003-43409 | 2/2003 |
| JP | A-2008-252319 | 10/2008 |
| WO | WO 2010/082496 A1 | 7/2010 |
| WO | WO 2010/092904 A1 | 8/2010 |
| WO | WO 2012/001880 A1 | 1/2012 |
| WO | WO 2012/001891 A1 | 1/2012 |
| WO | WO 2012/020527 A1 | 2/2012 |
| WO | WO 2012/020538 A1 | 2/2012 |

* cited by examiner

*Primary Examiner* — Paul Lee
(74) *Attorney, Agent, or Firm* — Oliff PLC

(57) ABSTRACT

A pair of shutter glasses comprises: a pair of shutter members each of which has the following states switchable from one to the other: an incident light transmitting state and an incident light blocking state; a frame member in which the pair of shutter members are accommodated; and a drive circuit and a drive power supply that drive the shutter members. The frame member includes: a rim to which the shutter members are attached; and a pair of temples each of which has one end connected to the rim. At least one of the drive circuit and the drive power supply is accommodated on the other end side of the temple.

6 Claims, 5 Drawing Sheets

SHUTTER GLASSES AND IMAGE DISPLAY SYSTEM COMPRISING AT LEAST ONE OF A DRIVE CIRCUIT OR A DRIVE POWER SUPPLY ACCOMMODATED ON A TEMPLE PORTION OF A FRAME MEMBER

BACKGROUND

1. Technical Field

The present invention relates to a pair of shutter glasses and an image display system.

2. Related Art

There has been a known image display system including an image display apparatus, such as a projector, and a pair of shutter glasses, such as a pair of glasses with built-in liquid crystal shutters.

In the image display system, a viewer wears the shutter glasses and views an image projected from the image display apparatus on a screen or any other suitable surface for stereoscopic image recognition.

The shutter glasses typically includes a pair of shutter members formed, for example, of liquid crystal shutters and a frame member in which the pair of shutter members and a drive circuit, a drive power supply, and other components that drive the pair of shutter members are accommodated.

The thus configured shutter glasses, which include a large number of components, tend to be heavier than a pair of typical glasses for diopter correction and hence tend to cause fatigue when worn for a long period.

To address the problem, a technique for allowing a user to wear a pair of shutter glasses more comfortably has been proposed (see JP-A-9-5904, for example).

In the shutter glasses (liquid crystal shutter glasses) described in JP-A-9-5904, a battery and electric parts for driving the shutter glasses are so accommodated in right and left side light blocking portions, which form a first eyeglass frame, that the left and right portions of the shutter glasses are balanced in terms of weight, whereby fatigue of the user who wears the shutter glasses is reduced.

However, the shutter glasses described in JP-A-9-5904, in which the battery and the electric parts are accommodated in the vicinity of the shutter members (liquid crystal shutters) disposed on the front side of the shutter glasses, disadvantageously have their center of gravity shifted frontward. As a result, when the viewer wears the shutter glasses, a large part of the weight of the shutter glasses acts on the viewer's nose, which supports the front portion of the shutter glasses. In this case, the viewer feels the shutter glasses to be heavier than they actually are, disadvantageously resulting in uncomfortable wearing experience and fatigue when the viewer views an image.

SUMMARY

An advantage of some aspects of the invention is to provide a pair of shutter glasses and an image display system that unlikely cause user's fatigue when the user views an image.

An aspect of the invention is directed to a pair of shutter glasses including a pair of shutter members each of which has the following states switchable from one to the other: an incident light transmitting state and an incident light blocking state, a frame member in which the pair of shutter members are accommodated, and a drive circuit and a drive power supply that drive the shutter members. The frame member includes a rim to which the shutter members are attached and a pair of temples each of which has one end connected to the rim. At least one of the drive circuit and the drive power supply is accommodated on the other end side of the temple.

In this aspect of the invention, at least one of the drive circuit and the drive power supply, which form part of the shutter glasses, is accommodated on the other end side of a temple, which allows the overall weight of the shutter glasses to remain unchanged but the center of gravity of the shutter glasses worn by a viewer to be shifted toward the other end side of the temples. As a result, a large part of the weight of the shutter glasses will not act on the viewer's nose, and hence apparent weight of the shutter glasses that the viewer feels can be reduced. The viewer can therefore wear the liquid glasses more comfortably, and viewer's fatigue caused when the viewer views an image can be reduced.

In the shutter glasses according to the aspect of the invention, at least one of the drive circuit and the drive power supply is preferably accommodated in a free end portion on the other end side of a temple.

In this configuration, since at least one of the drive circuit and the drive power supply is accommodated in the free end portion on the other end side of a temple, the portions of the temple that are not the free end portion or do not accommodate the drive circuit or the drive power supply can be thin and narrow. As a result, the shutter glasses worn over another pair of glasses for diopter correction or other purposes unlikely interfere therewith, whereby the viewer can wear the shutter glasses further more comfortably.

In the shutter glasses according to the aspect of the invention, the pair of temples of the shutter glasses worn by a viewer are preferably so bent that the free end portions on the other end side extend downward and approach each other.

In this configuration, since the free end portions of the pair of temples are so bent that they extend downward and approach each other, the free end portions are so located that they follow the shape of the back of the head of the viewer who wears the shutter glasses. As a result, the temples fit with left and right side portions of the back of the head of the viewer, and hence the viewer can wear the shutter glasses further more comfortably. Further, the thus bent free end portions reliably prevent them from interfering with another pair of glasses even when the viewer wears the shutter glasses over the other pair of glasses.

In the shutter glasses according to the aspect of the invention, the temples preferably extend from the rim obliquely upward.

In this configuration, since the temples extend from the rim obliquely upward, the shutter glasses can be supported by a portion between the back of the head of the viewer and a top portion of the head. As a result, the shutter glasses worn over another pair of glasses will not interfere therewith at the ears of the viewer, whereby the viewer can wear the shutter glasses more comfortably. Further, since the other ends of the temples are supported by the portion between the back of the head of the viewer and the top portion of the head, the weight of the shutter glasses that acts on the viewer's nose, which is positioned on the opposite side to the other ends of the temples, can be reduced, whereby the viewer can wear the shutter glasses further more comfortably.

Another aspect of the invention is directed to an image display system including any of the pair of shutter glasses described above and an image display apparatus that alternately displays a first image and a second image in a time division manner.

In this aspect of the invention, since the viewer views a first image and a second image alternately displayed by the image display apparatus through the shutter glasses worn by the viewer comfortably as described above, viewer's fatigue caused when the viewer views a stereoscopic image or any other similar image displayed by the image display apparatus can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below with reference to the drawings.

Configuration of Image Display System

Figure 1:
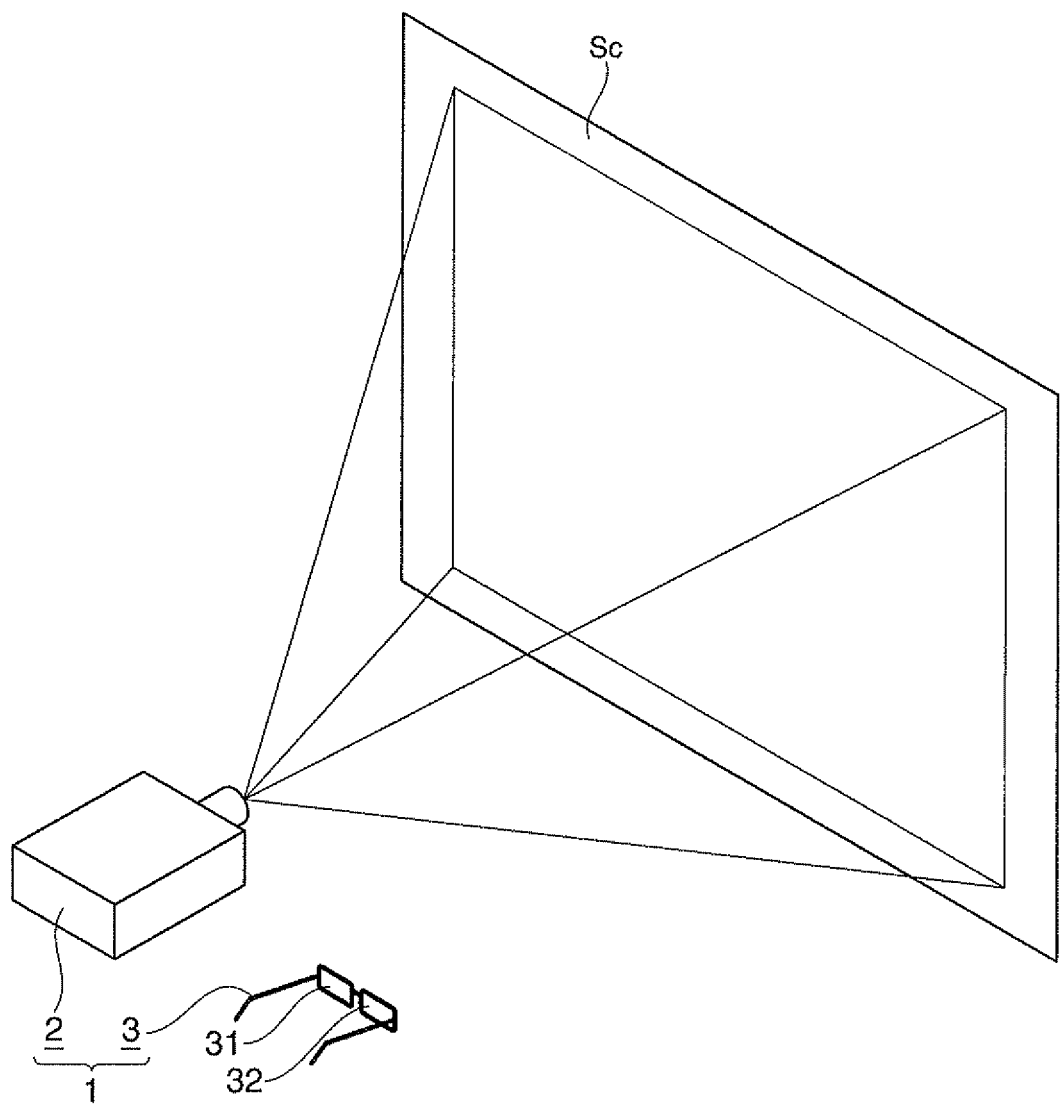
FIG. 1 is a perspective view showing how to use an image display system in a first embodiment.

FIG. 1 is a perspective view showing how to use an image display system 1 in the present embodiment.

The image display system 1 projects and displays an image on a reflective screen Sc and allows a viewer to view the projected image stereoscopically. The image display system 1 includes a projector 2 as an image display apparatus and a pair of liquid crystal shutter glasses 3 as a pair of shutter glasses, as shown in FIG. 1.

The projector 2 forms image light based on image information (image data) and projects the image light on the screen Sc. The projector 2 projects an image for the left eye (first image) and an image for the right eye (second image) in a time division manner or alternately in a fixed cycle. That is, the image for the left eye and the image for the right eye are alternately displayed on the screen Sc. The projector 2 supplies the liquid crystal shutter glasses 3 with a sync signal that allows them to recognize the timing when the images are switched.

The liquid crystal shutter glasses 3, which the viewer wears, include a selector for the left eye 31 and a selector for the right eye 32 (which will be described later) as a pair of shutter members, and the selectors 31 and 32 have the following states switchable from one to the other: a light transmitting state in which each of the selectors transmits light and a light blocking state in which each of the selectors blocks light.

The liquid crystal shutter glasses 3 receive the sync signal supplied from the projector 2 to recognize the timing when the projector 2 switches the displayed image between an image for the left eye and an image for the right eye and switch the states of the selector for the left eye 31 and the selector for the right eye 32 between the light transmitting state and the light blocking state in synchronization with the display switching operation.

That is, during a period when an image for the left eye is being displayed on the screen Sc, the selector for the left eye 31 transmits light and the selector for the right eye 32 blocks light. On the other hand, during a period when an image for the right eye is being displayed on the screen Sc, the selector for the right eye 32 transmits light and the selector for the left eye 31 blocks light.

The thus configured image display system 1 allows the viewer to visually recognize an image (image for the left eye) projected on the screen Sc only with the left eye and an image (image for the right eye) projected on the screen Sc only with the right eye. The viewer therefore stereoscopically views the images projected on the screen Sc with the aid of parallax.

Configuration of Liquid Crystal Shutter Glasses

Figure 2:
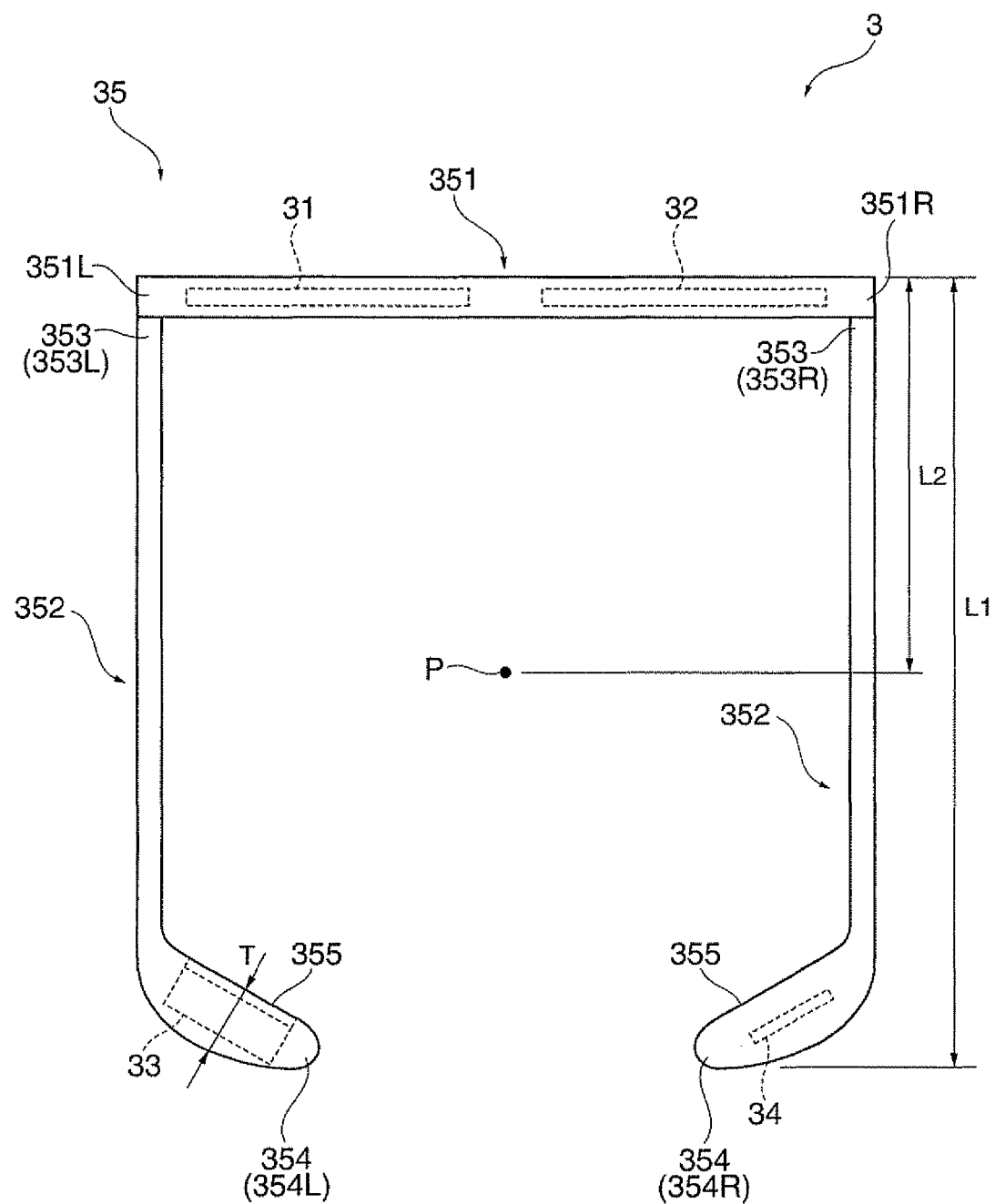
FIG. 2 is a top view diagrammatically showing the configuration of a pair of liquid crystal shutter glasses in the embodiment.
Figure 3:
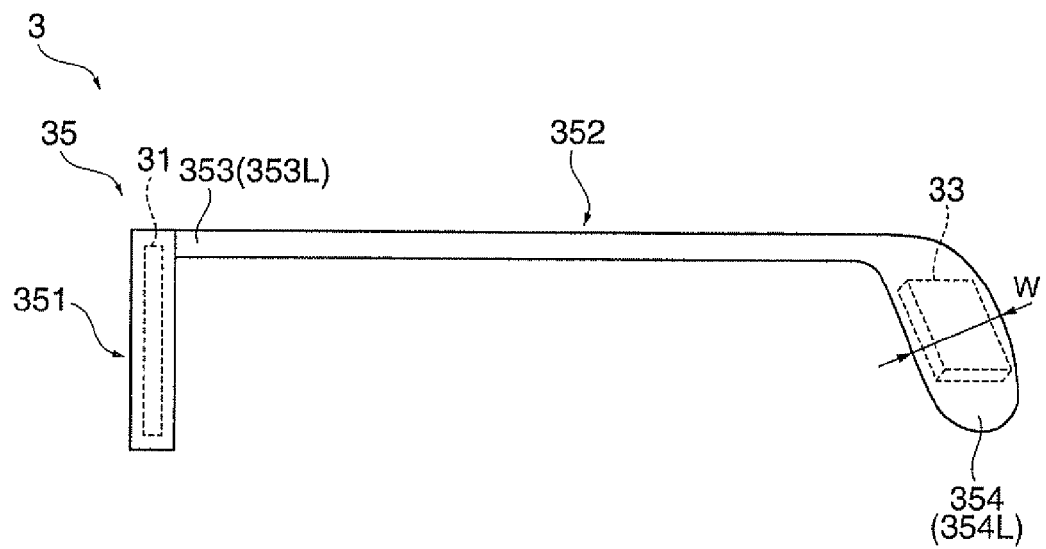
FIG. 3 is a side view diagrammatically showing the configuration of the pair of liquid crystal shutter glasses in the embodiment.

FIGS. 2 and 3 are diagrammatic views showing the configuration of the liquid crystal shutter glasses 3. Specifically, FIG. 2 is a top view of the liquid crystal shutter glasses 3, and FIG. 3 is a side view (side view on the left eye side) of the liquid crystal shutter glasses 3.

The liquid crystal shutter glasses 3 include the selector for the left eye 31, the selector for the right eye 32, a drive circuit 33, a battery 34 as a drive power supply, and a frame member 35, as shown in FIGS. 2 and 3.

Each of the selector for the left eye 31 and the selector for the right eye 32 is formed of what is called a liquid crystal shutter, and the state thereof is switched between the light transmitting state, in which the selector transmits light, and the light blocking state, in which the selector blocks light, as described above. The selector for the left eye 31 and the selector for the right eye 32 are assembled side by side and have as a whole a flat plate shape, as shown in FIG. 2, as in the case of eyeglass lenses of a pair of glasses for diopter correction.

The drive circuit 33 is a circuit component formed of a driver IC (integrated circuit), a connector, a printed circuit board, and other parts necessary for driving the selector for the left eye 31, the selector for the right eye 32, and other parts.

The battery 34, which is a button battery in the present embodiment, is a power supply battery that supplies electric power to the drive circuit 33.

As shown in FIGS. 2 and 3, the frame member 35 includes a rim 351 and a pair of temples 352 and has a substantially U-like shape in a top view (FIG. 2).

The rim 351 connects the selector for the left eye 31 and the selector for the right eye 32 to each other and holds them. The rim 351 has a pad (not shown) formed under a central portion where the selector for the left eye 31 and the selector for the right eye 32 are connected to each other, and the pad comes into contact with the viewer's nose when the viewer wears the liquid crystal shutter glasses 3. The rim 351 is also provided with an infrared light receiving device or any other light receiver (not shown) that receives the sync signal described above.

Each of the temples 352, although the configuration thereof will not be specifically described, is foldable with respect to the rim 351. The following description will be made with reference to a state in which the viewer wears the liquid crystal shutter glasses 3 (worn state), that is, the temples 352 are unfolded, as shown in FIGS. 2 and 3.

Each of the temples 352 has a base end portion 353, which is one end of the temple 352, connected to the rim 351, as shown in FIGS. 2 and 3. Specifically, a left base end portion 353L is connected to a left edge portion 351L of the rim 351, and a right base end portion 353R is connected to a right edge portion 351I of the rim 351. The temples 352 are so connected to the rim 351 that they are perpendicular to the selector for the left eye 31 and the selector for the right eye 32, which are held by the rim 351 and assembled side by side in a flat plate shape, as shown in the side view of FIG. 3.

Each of the temples 352 has a free end portion 354, which is the other end of the temple 352, bent downward and approaching the other so that the temples 352 follow the shape of the back of the head of the viewer, as shown in FIG. 2. In other words, the temples 352 are so configured that the free end portions 354 thereof are bent and approach each other in the top view and bent downward to form an L-like shape in the side view of FIG. 3.

The position, the shape, the size, the angle, and other features of the free end portions 354 are so set that support surfaces 355 thereof come into contact with side portions of the back of the head of the viewer (left and right side portions of the back of the head) when the nose of the viewer who wears the liquid crystal shutter glasses 3 supports the rim 351.

Each of the free end portions 354 has a greater thickness T (FIG. 2) and a greater width W (FIG. 3) than those of the other portions of the temple 352. It is noted that the thickness of each of the temples 352 is defined in the top view of FIG. 2 and the width of the temple 352 is defined in the side view of FIG. 3.

The free end portions 354 have the drive circuit 33 and the battery 34 accommodated therein. Specifically, a left free end portion 354L accommodates the drive circuit 33, and aright free end portion 354R accommodates the battery 34. The drive circuit 33 and the battery 34 are connected to the selector for the left eye 31 and the selector for the right eye 32 via flexible substrates or other suitable components accommodated in the temples 352.

The drive circuit 33 and the battery 34 are so accommodated in the free end portions 354 that the center of gravity P (FIG. 2) of the liquid crystal shutter glasses 3 is adjusted. Specifically, the center of gravity P of the liquid crystal shutter glasses 3 is so set that a total length L1 of the liquid crystal shutter glasses 3 in the front-rear direction and a distance L2 from the front edge of the liquid crystal shutter glasses 3 to the center of gravity P thereof satisfy $1/3 \times L1 \leq L2 \leq 1/1 \times L1$ as shown in FIG. 2.

Figure 4:
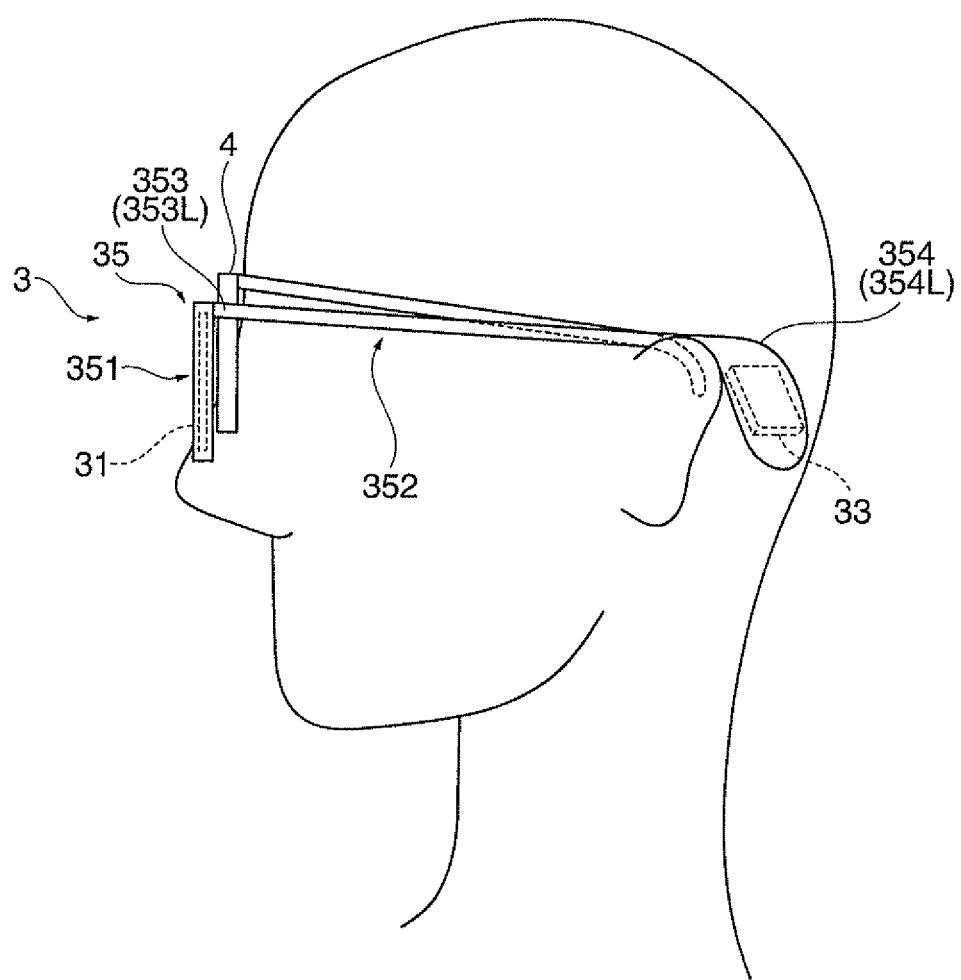
FIG. 4 is a side view showing how to use the liquid crystal shutter glasses in the embodiment.

FIG. 4 is a side view showing how to use the liquid crystal shutter glasses 3. Specifically, FIG. 4 shows how to use the liquid crystal shutter glasses 3 worn by the viewer over another pair of glasses 4 for diopter correction or other purposes.

The liquid crystal shutter glasses 3 are so worn by the viewer that the rim 351 is supported by the viewer's nose and portions of the temples 352 close to the free end portions 354 are supported by the viewer's ears as shown in FIG. 4.

Since the thus supported liquid crystal shutter glasses 3, even when worn over the other pair of glasses 4, unlikely interfere therewith because the portions of the temples 352 other than the free end portions 354 are thin and narrow. Further, since the free end portions 354 are positioned at side back portions of the head, the other pair of glasses 4, which are supported by the ears, will not interfere with the free end portions 354.

The first embodiment described above provides the following advantageous effects.

The drive circuit 33 and the battery 34, which form part of the liquid crystal shutter glasses 3, are accommodated on the other end side of the temples 352, which allows the overall weight of the liquid crystal shutter glasses 3 to remain unchanged but the center of gravity P of the liquid crystal shutter glasses 3 worn by the viewer to be shifted toward the other end side of the temples 352. As a result, a large part of the weight of the liquid crystal shutter glasses 3 will not act on the viewer's nose, and hence apparent weight of the liquid crystal shutter glasses 3 that the viewer feels can be reduced. The viewer can therefore wear the liquid crystal shutter glasses 3 more comfortably.

Since the viewer views an image displayed from the projector 2 on the screen Sc through the thus configured liquid crystal shutter glasses 3 worn by the viewer more comfortably, viewer's fatigue caused when the viewer views the displayed image can be reduced.

Further, since the drive circuit 33 and the battery 34 are accommodated in the free end portions 354 on the other end side of the temples 352, the portions of the temples 352 that are not the free end portions 354 or do not accommodate the drive circuit 33 or the battery 34 can be thin and narrow. As a result, the liquid crystal shutter glasses 3 worn over the other pair of glasses 4 unlikely interfere therewith, whereby the viewer can wear the liquid crystal shutter glasses 3 further more comfortably.

Moreover, since the free end portions 354 of the pair of temples 352 are so bent that they extend downward and approach each other, the free end portions 354 are so located that they follow the shape of the back of the head of the viewer who wears the liquid crystal shutter glasses 3. As a result, the temples 352 fit with left and right side portions of the back of the head of the viewer, and hence the viewer can wear the liquid crystal shutter glasses 3 further more comfortably. Further, the thus bent free end portions 354 reliably prevent them from interfering with the other pair of glasses 4 even when the viewer wears the liquid crystal shutter glasses 3 over the other pair of glasses 4.

Second Embodiment

A second embodiment of the invention will next be described with reference to the drawings.

In the following description, the same structures and members as those in the first embodiment described above have the same reference characters, and descriptions of these structures and members will be omitted or simplified.

The second embodiment, which will be described below, differs from the image display system 1 in the first embodiment in terms of the structure of the liquid crystal shutter glasses. The other structures are the same as those in the first embodiment described above.

Figure 5:
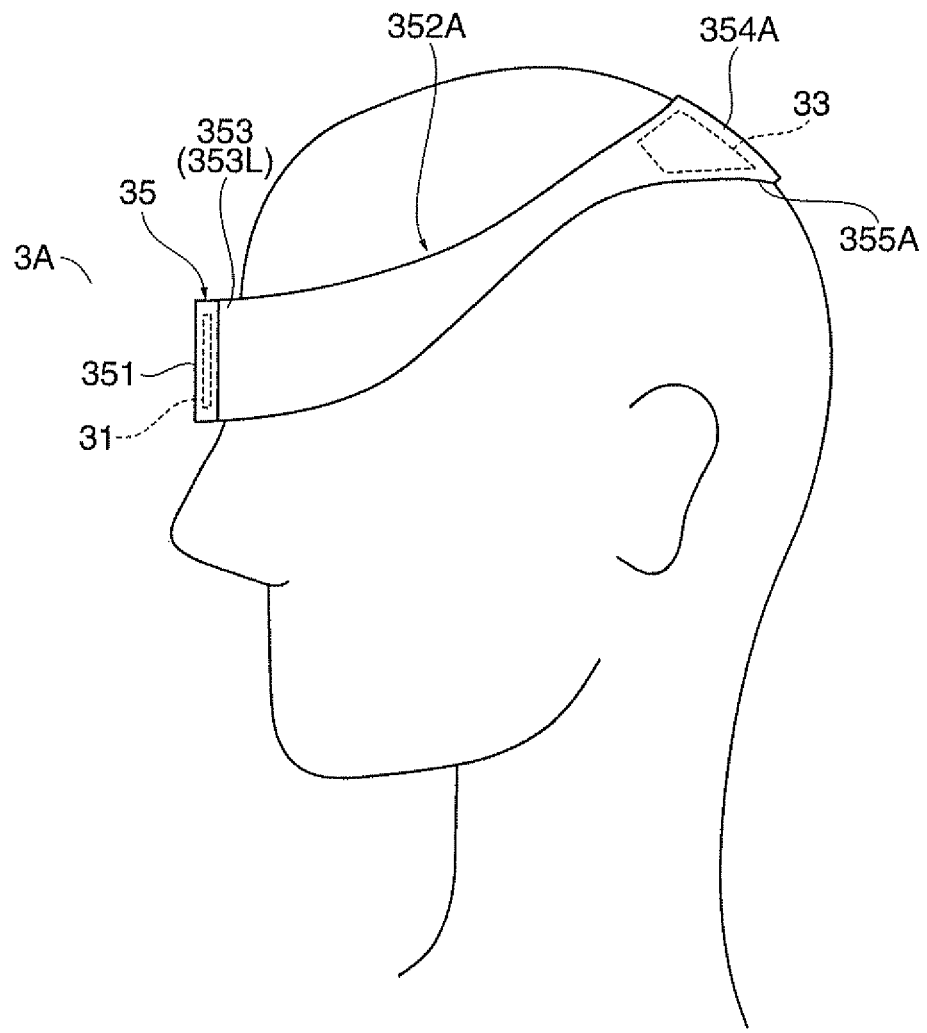
FIG. 5 is a side view diagrammatically showing the configuration of a pair of liquid crystal shutter glasses in a second embodiment.

FIG. 5 is a side view diagrammatically showing the configuration of a pair of liquid crystal shutter glasses 3A in the present embodiment. Specifically, FIG. 5 is a side view of the liquid crystal shutter glasses 3A worn by the viewer.

In the liquid crystal shutter glasses 3A in the present embodiment, temples 352A have a structure different from that of the temples 352 of the liquid crystal shutter glasses 3 in the first embodiment described above.

A pair of temples 352A of the liquid crystal shutter glasses 3A in the present embodiment extend from the rim 351 obliquely upward, as shown in FIG. 5. That is, the temples 352A are so connected that they intersect the selector for the left eye 31 and the selector for the right eye 32, which are held by the rim 351 and assembled side by side in a flat plate shape (see FIG. 1 and other figures), at a small angle in a side view. In other words, when the viewer wears the liquid crystal shutter glasses 3A, the temples 352A extend from positions corresponding to the viewer's nose toward a top portion of the back of the head (portion between the back of the head and the top thereof) in a side view.

Free end portions 354A of the pair of temples 352A are so located that they follow the shape of the top portion of the back of the head of the viewer. That is, the position, the shape, the size, and other features of the free end portions 354A are so set that viewer-side support surfaces 355A thereof come into contact with left and right top portions of the back of the head of the viewer when the nose of the viewer who wears the liquid crystal shutter glasses 3A supports the rim 351. Specifically, each of the temples 352A is so configured that the width of the free end portion 354A increases toward the edge of the other end, and that the viewer-side support surfaces 355A of the free end portions 354 follow the shape of the top portion of the back of the head.

As a result, the liquid crystal shutter glasses 3A are so worn by the viewer that the rim 351 is supported by the viewer's nose and the free end portions 354A are supported by the left and right top portions of the back of the head of the viewer.

The second embodiment described above provides not only the same advantageous effects as those provided in the first embodiment described above but also the following advantageous effects.

Since the temples 352A extend from the rim 351 obliquely upward, the liquid crystal shutter glasses 3A can be supported by the top portion of the back of the head of the viewer. As a result, the liquid crystal shutter glasses 3A worn over another pair of glasses will not interfere therewith at the ears of the viewer, whereby the viewer can wear the liquid crystal shutter glasses 3 more comfortably. Further, since the other ends of the temples 352A are supported by the top portion of the back of the head of the viewer, the weight of the liquid crystal shutter glasses 3A that acts on the viewer's nose, which is positioned on the opposite side to the other ends of the temples 352A, can be reduced, whereby the viewer can wear the liquid crystal shutter glasses 3A further more comfortably.

The invention is not limited to the embodiments described above. Changes, improvements, and other modifications can be made to the extent that the advantage of some aspects of the invention is achieved, and these changes, improvements, and other modifications fall within the scope of the invention.

In the embodiments described above, in which the drive circuit 33 and the battery 34 are accommodated in the free end portions (free end portions 354 and 354A) of the temples 352 and 352A, the drive circuit 33 and the battery 34 may alternatively be accommodated in portions other than the free end portions as long as the accommodated drive circuit 33 and battery 34 shift the center of gravity of the liquid crystal shutter glasses worn by the viewer backward. Further, both the drive circuit 33 and the battery 34 may not be accommodated in the free end portions 354 and 354A. Instead, at least one of the drive circuit 33 and the battery 34 may be accommodated in the free end portions 354 and 354A.

In the embodiments described above, the liquid crystal shutter glasses 3 have a U-like shape in a plan view but may instead have a ring shape.

In each of the embodiments described above, the image display system according to the embodiment of the invention is the image display system 1 that allows the viewer to view a projected image stereoscopically but the image display system is not necessarily configured this way. For example, an image for the left eye and an image for the right eye may have contents different from each other, and a dual display system that projects and displays the two images may be provided.

When the image display system is configured as the dual display system described above, the liquid crystal shutter glasses 3 may be replaced with the following two types of glasses: a pair of glasses having the selector for the left eye 31 provided on both sides and a pair of glasses having the selector for the right eye 32 provided on both sides.

In each of the embodiments described above, the image display system 1 has been described only with reference to the front projection projector 2. The invention may alternatively be applied to an image display system including a screen and a rear projection projector that projects an image through the rear side of the screen. Still alternatively, the invention may be applied to an image display system using a television receiver, a computer monitor, or any other suitable apparatus as the image display apparatus.

In each of the embodiments described above, the shutter glasses according to the embodiment of the invention are the liquid crystal shutter glasses 3, which are based on liquid crystal shutters, but the shutter glasses are not necessarily configured this way. The invention may be applied to shutter glasses using other electric components to switch the state thereof between the incident light transmitting state and the incident light blocking state.

The invention can be used with an image display system that includes a projector and a pair of glasses and allows a viewer to view an image stereoscopically.

The entire disclosure of Japanese Patent Application No. 2010-202268, filed Sep. 9, 2010 is expressly incorporated by reference herein.

What is claimed is:

1. A pair of shutter glasses comprising:
a pair of shutter members each of which has the following states switchable from one to the other: an incident light transmitting state and an incident light blocking state;
a frame member in which the pair of shutter members are accommodated; and
a drive circuit and a drive power supply that drive the shutter members,
wherein the frame member includes
a rim to which the shutter members are attached, and
a pair of temples each of which has one end connected to the rim and each of which has a free end portion on an other end side, the free end portions having a greater thickness and a greater width than other portions of the temple, and
at least one of the drive circuit and the drive power supply is accommodated on the other end side of the temple.

2. The pair of shutter glasses according to claim 1, wherein at least one of the drive circuit and the drive power supply is accommodated in a free end portion on the other end side of a temple.

3. The pair of shutter glasses according to claim 1, wherein the pair of temples of the shutter glasses worn by a viewer are so bent that the free end portions on the other end side extend downward and approach each other.

4. An image display system comprising:
the pair of shutter glasses according to claim 1; and
an image display apparatus that alternately displays a first image and a second image in a time division manner.

5. An image display system comprising:
the pair of shutter glasses according to claim 2; and
an image display apparatus that alternately displays a first image and a second image in a time division manner.

6. An image display system comprising:
the pair of shutter glasses according to claim 3; and
an image display apparatus that alternately displays a first image and a second image in a time division manner.

* * * * *